United States Patent Office 3,669,738
Patented June 13, 1972

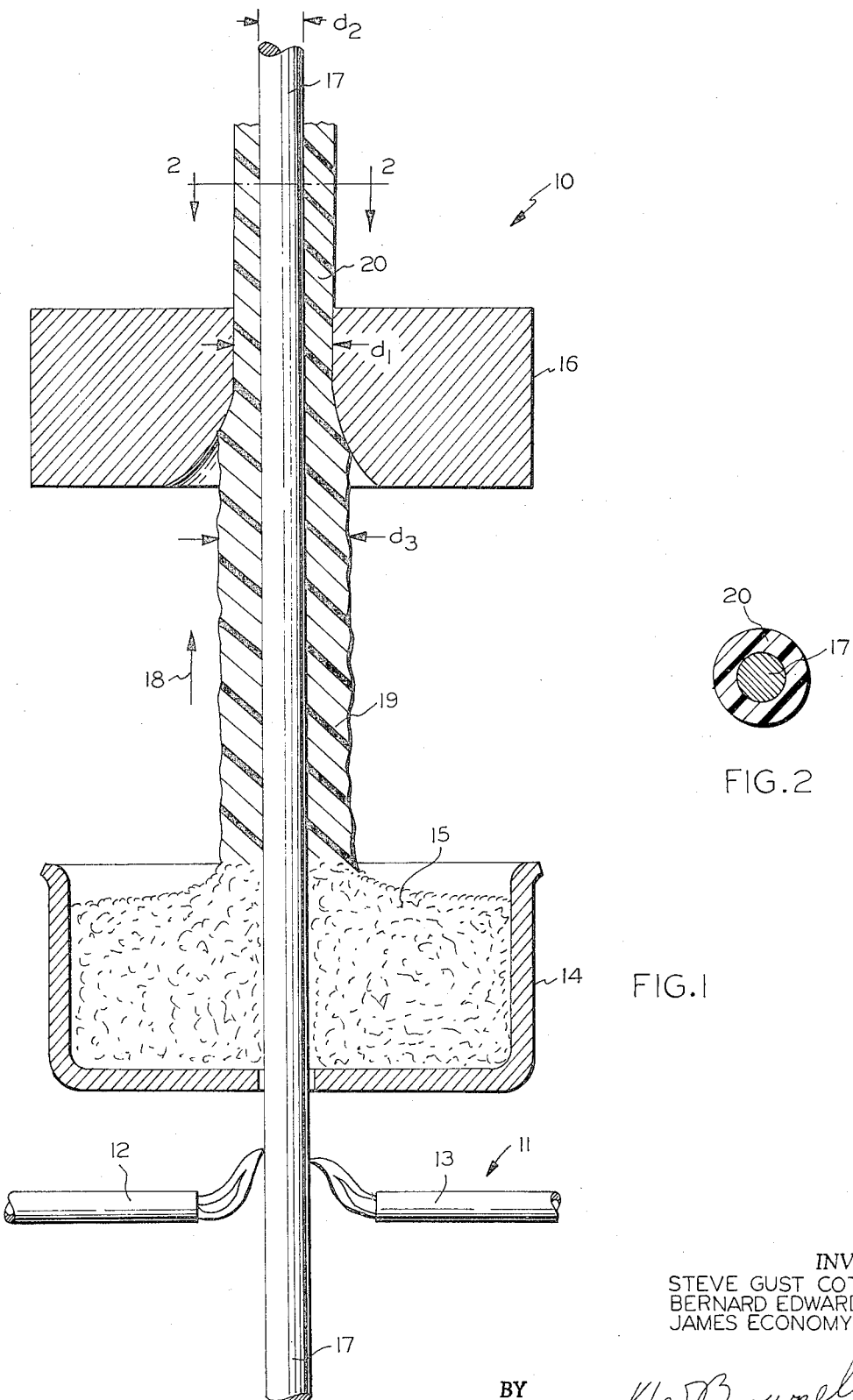

---

3,669,738
POLYESTER COATED WIRE
Steve G. Cottis, Buffalo, Bernard E. Nowak, Lancaster, and James Economy, Buffalo, N.Y., assignors to The Carborundum Company, Niagara Falls, N.Y.
Filed May 28, 1969, Ser. No. 828,652
Int. Cl. B44d 1/42, 1/094, 1/097
U.S. Cl. 117—232    11 Claims

ABSTRACT OF THE DISCLOSURE

A wire insulated with an impervious oxybenzoyl polyester coating which can be produced by drawing the wire having a porous coating through a die.

---

Wires electrically insulated with polymers are well known in the art. Two widely used classes of polymers are polyesters the most common example of which is polyethyleneterephthalate commercially available as Mylar and fluorocarbon polymers such as polytetrafluoroethylene commercially available as Teflon. While such insulated wires have found wide acceptance they are generally unsuitable for carrying high frequency currents and/or for operation at high temperatures such as those above 600° F. When operating under these conditions undesirable degradation of the polymer coating occurs decreasing its electrical resistance and rendering the wire susceptible to short circuits and exposure to the elements.

According to recently discovered techniques it is now possible to produce high molecular weight oxybenzoyl polyesters which have advantageous physical and chemical properties rendering them especially suitable for use as insulation on electrically conductive wires. However, it has heretofore been impossible to coat wires with these oxybenzoyl polyesters due to their tendency to thermally degrade at temperatures below their melting point. Notwithstanding this difficulty, however, these polyesters are resistant to temperatures up to and sometimes exceeding 700° F.

It is therefore an object of the present invention to provide an improved insulated wire and process for producing such which is substantially free of the disadvantages of the prior art.

Another object is to provide an improved process for producing an insulated wire which functions satisfactorily at high temperatures and/or high frequencies.

A further object is to provide an improved wire insulated with an oxybenzoyl polyester coating and an improved process for producing such.

Yet another object is to provide an improved process for producing a wire insulated with an impervious oxybenzoyl polyester coating.

Additional objects and advantages of the present invention will be apparent to those skilled in the art by reference to the following detailed description and drawings wherein:

FIG. 1 is a schematic representation of an apparatus suitable for practicing the process of the present invention, and FIG. 2 is a sectional view of a wire of the present invention taken along line 2—2 of FIG. 1.

According to the present invention it has been discovered that wires insulated with an impervious oxybenzoyl polyester coating can be produced by drawing the wire having a porous oxybenzoyl polyester coating through a die.

A preferred process of the present invention comprises the steps of forming a porous coating of granular oxybenzoyl polyester on the wire and then drawing the coated wire through a die to render the porous coating impervious.

Referring now to the drawings and in particular to FIG. 1 there is schematically shown an apparatus 10 suitable for practicing the process of the present invention. The apparatus 10 comprises a heating section 11 having burners 12 and 13; a container 14 adapted to hold an oxybenzoyl polyester 15; and a die 16. In operation a wire 17 is caused to move in the direction of the arrow 18 by any suitable means not shown. The burners 12 and 13 heat the wire 17 to the desired temperature whereupon the wire 17 passes through a hole in the bottom of the container 14 and then contacts the polyester 15. The granules of polyester 15 adhere to the wire forming a porous coating 19 having a rough surface. The wire 17 having the coating 19 then passes through the die 16 wherein the coating 19 is subjected to shearing action which decreases the porosity of the coating 19 to produce a smooth impervious coating 20 on the wire 17. The diameter, $d_1$, of the die 16 is greater than the diameter, $d_2$, of the wire 17 but is less than the diameter, $d_3$, of the wire 17 with rough coating 19. The process can be practiced simultaneously, i.e., with the container 14 in contact with the die 16, which can also be heated.

The temperature of the wire 17 prior to contacting the polyester 15 is critical and is usually 200 to 1200° F. and is preferably 500 to 1100° F. At temperatures much below these ranges the polyester 15 does not adhere to the wire 17 whereas at temperatures much above these ranges thermal degradation of the polyester occurs. It will be readily apparent that the heating can be accomplished by other means such as electrical resistance or electrical induction.

The wire 17 can be a low resistance material such as silver or preferably copper, or can also be a high resistance material such as tungsten or Nichrome. The wire 17 can also have a coating or can be subjected to conventional pretreatments.

The oxybenzoyl polyesters useful in the present invention are generally those of repeating units of Formula I:

(I)
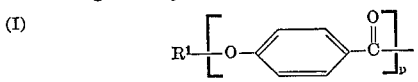

One preferred class of oxybenzoyl polyesters are those of Formula II:

(II)
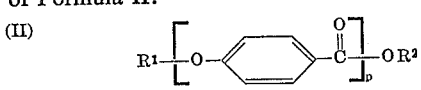

wherein $R^1$ is a member selected from the group consisting of benzoyl, lower alkanoyl, or preferably hydrogen; wherein $R^2$ is hydrogen, benzyl, lower alkyl, or preferably phenyl and $p$ is an integer from 3 to 600 and preferably 30 to 200. These values of $p$ correspond to a molecular weight of about 1,000 to 72,000 and preferably 3,500 to 25,000. The synthesis of these polyesters is described in detail in U.S. patent application Ser. No. 619,577 filed Mar. 1, 1967 and now abandoned, entitled "Polyesters Based on Hydroxybenzoic Acids," the disclosure of which is incorporated herein by reference.

Another preferred class of oxybenzoyl polyesters are copolyesters of recurring units of Formulae I, III and IV:

(III)
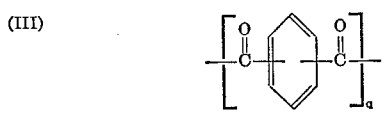

(IV)
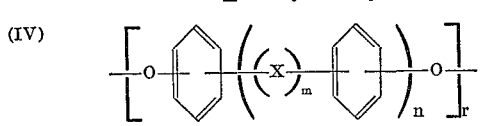

wherein X is —O— or —SO$_2$—; $m$ is 0 or 1; $n$ is 0 or 1; $q:r=10:15$ to $15:10$; $p:q=1:100$ to $100:1$; $p+q+r=3$ to 600 and preferably 30 to 200, these values corresponding to molecular weights of from 500 to over 72,000 and preferably from 3,500 to 25,000. The carbonyl groups of the moiety of Formula I or III are linked to the oxy groups of a moiety of Formula I or IV; the oxy groups of the moiety of Formula I or IV are linked to the carbnyl groups of the moiety of Formula I or III.

The preferred copolyesters are those of recurring units of Formula V:

(V)

The synthesis of these polyesters is described in detail in U.S. patent application Ser. No. 828,484 filed concurrently herewith entitled "P-Oxybenzoyl Copolyesters" the disclosure of which is incorporated herein by reference.

The polyesters useful in the present invention can also be chemically modified by various means such as by inclusion in the polyester of monofunctional reactants such as benzoic acid or tri- or higher functional reactants such as trimesic acid or cyanuric chloride. The benzene rings in these polyesters are preferably unsubstituted but can be substituted with non-interfering substituents examples of which include among others halogen such as chlorine or bromine, lower alkoxy such as methoxy and lower alkyl such as methyl.

The polyesters useful in the present invention can be employed in their pure form, mixed with one another or with a wide variety of organic and/or inorganic fillers which do not affect their electrical properties. Examples of suitable organic filers include among others polyhalogenated addition polymers such as polytetrafluoroethylene and condensation polymers such as polyimides. Examples of suitable inorganic fillers include glass fibers. These fillers can comprise up to 70 wt. percent of the combined weight of polyester and filler.

EXAMPLE 1

A mixture of 856 g. of phenyl para-hydroxybenzoate, 0.015 g. of tetra-n-butyl orthotitanate and 1800 g. of a polychlorinated polyphenyl solvent (B.P. 360–370° C.) is heated, with constant stirring and under an atmosphere of flowing nitrogen, at 170–190° C. for 4 hours and then at 340–360° C. for 10 hours. Early in this heating cycle the mixture becomes a homogeneous liquid. During the heating cycle condensation occurs, accompanied by the distillation of phenol, and the polyester which is produced thereby forms a precipitate. The mixture is cooled to room temperature and extracted with acetone to remove the polychlorinated polyphenyl solvent, and the product is dried overnight in vacuum at 60° C. A yield of 377 g. of polyester powder is obtained, consisting essentially of a para-oxybenzoyl polyester.

EXAMPLE 2

This example illustrates the synthesis of a copolyester useful in the present invention.

The following quantities of the following ingredients are combined as indicated.

| Item | Ingredient | Quantity Grams | Moles |
|---|---|---|---|
| A | P-hydroxybenzoic acid | 138 | 1 |
| B | Phenyl acetate | 170 | 1.25 |
| C | Therminol 77 | 500 | |
| D | Diphenyl terephthalate | 318 | 1 |
| E | Hydrogen chloride | | |
| F | Hydroquinone | 111 | 1.01 |
| G | Therminol 77 | 500 | |

Items A–D are charged to a four-necked, round bottom flask fitted with a thermometer, a stirrer, a combined nitrogen and HCl inlet and an outlet connected to a condenser. Nitrogen is passed slowly through the inlet. The flask and its contents are heated to 180° C. whereupon HCl is bubbled through the reaction mixture. The outlet head temperature is kept at 110°–120° C. by external heating during the p-hydroxybenzoic acid, phenyl acetate ester exchange reaction.

The flask and its contents are stirred at 180° C. for 6 hours whereupon the HCl is shut off, the outlet head temperature raised to 180°–190° C. and the mixture stirred at 220° C. for 3.5 hours. Up to this point, 159 grams of distillate are collected in the condenser. Item F is then added and the temperature gradually increased from 220° C. to 320° C. over a period of 10 hours (10° C./hr.). Stirring is continued at 320° C. for 16 hours and then for three additional hours at 340° C. to form a slurry. The total amount of distillate, consisting of phenol, acetic acid and phenyl acetate, amounts to 384 g. Item G is added and the reaction mixture permitted to cool to 70° C. Acetone (750 ml.) is added and the slurry filtered, the solids are extracted in a Soxhlet with acetone to remove items C and G. The solids are dried in vacuo at 110° C. overnight whereupon the resultant copolyester (320 g., 89.2% of theory) is recovered as a granular powder.

EXAMPLE 3

The polyester of Example 1 is placed in a container 14 of an apparatus 10 similar to that shown in FIG. 1. The wire 17 which is of copper heated to a temperature of 600° F. and passed through the polyester at a speed of approximately 5 ft./sec. to form a coated wire which is passed through a die 16 to render the coating smooth and impervious. The resultant coated wire functions satisfactorily as an electrical conductor and when immersed in hydrochloric acid gives no indication of attack of the wire 17. A wire similarily produced except that it is not passed through the die 16, bubbles and shows other evidence of attack of the wire 17 through the coating 20, when immersed in hydrochloric acid.

EXAMPLE 4

The procedure of Example 3 is repeated employing the same times, temperatures and conditions with the exception that the polyester of Example 1 is replaced by the polyester of Example 2 with similar results.

EXAMPLE 5

The procedure of Example 3 is repeated employing the same times and conditions except that the burners 12 and 13 and the container 14 are removed and the oxybenzoyl polyester of Example 1 is flame sprayed onto the wire 17 with similar results.

Although the invention has been described in considerable detail with reference to certain preferred embodiments thereof, it will be understood that variations and modifications can be effected within the spirit and scope of the invention as described above and as defined in the appended claims.

What is claimed is:

1. A process of producing a wire insulated with an impervious coating of an oxybenzoyl polyester comprising forming a porous coating of said oxybenzoyl polyester on a wire, and drawing the coated wire through a die having a diameter greater than the diameter of said wire but less than the diameter of said coated wire whereby said porous coating is rendered impervious, said oxybenzoyl polyester having a molecular weight of at least about 3,500 and being infusible and being selected from the group consisting of:

(a) A polyester consisting essentially of from about 30 to about 200 recurring structural units of the formula

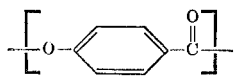

and (b) A polyester consisting essentially of recurring structural units of Formulas I, III and IV (I) 

(III) 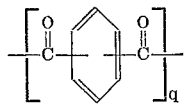

(IV) 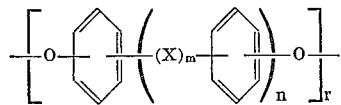

wherein X is —O— or —SO$_2$—; $m$ is 0 or 1; $n$ is 0 or 1; $q:r=10:15$ to $15:10$; $p:q=1:100$ to $100:1$; $p+q+r=30$ to $200$; the carbonyl groups of the moiety of Formula I or III are linked to the oxy groups of the moiety of Formula I or IV; and the oxy groups of the moiety of Formula I or IV are linked to the carbonyl groups of the moiety of Formula I or III.

2. A process as set forth in claim 1 wherein said porous coating is formed on said wire by heating said wire to a temperature in the range from 500° F. to 1200° F. and passing the heated wire through a mass of granules of said oxybenzoyl polyester whereby said granules form an adherent porous coating on the wire.

3. A process as set forth in claim 1 wherein said porous coating is formed by flame spraying said oxybenzoyl polyester on said wire.

4. A process as set forth in claim 1 wherein said wire is copper.

5. A process as set forth in claim 1 wherein said oxybenzoyl polyester has a molecular weight of from 3,500 to 25,000 and consists essentially of from about 30 to about 200 recurring structural units of the formula

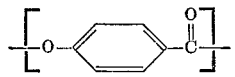

6. A process as set forth in claim 5 wherein said oxybenzoyl polyester has the formula

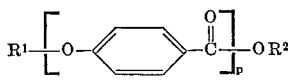

wherein R$^1$ is selected from the group consisting of benzgroup consisting of hydrogen, benzoyl and phenyl and $p$ zoyl, lower alkanoyl and hydrogen; R$^2$ is selected from the is an integer from 30 to 200.

7. A process as set forth in claim 6 wherein R$^1$ is hydrogen and R$^2$ is phenyl.

8. A process as set forth in claim 1 wherein said oxybenzoyl polyester has a molecular weight of from 3,500 to 25,000 and consists essentially of recurring structural units of Formulas I, III, and IV.

9. A process as set forth in claim 8 wherein $m$ is 0.

10. A process as set forth in claim 8 wherein $n$ is 0.

11. A process as set forth in claim 8 wherein said oxybenzoyl polyester consists essentially of recurring units of the formula

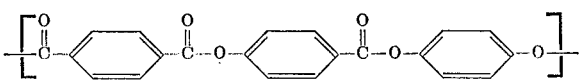

References Cited

UNITED STATES PATENTS

| | | | |
|---|---|---|---|
| 2,471,023 | 5/1949 | Cook et al. | 260—78.3 |
| 2,760,229 | 8/1956 | Cheney et al. | 118—405 |
| 2,883,039 | 4/1959 | Smollinger et al. | 118—405 |
| 3,039,994 | 6/1962 | Gleim | 260—47 C |
| 3,197,324 | 7/1965 | Brooks | 117—21 |
| 3,443,007 | 5/1969 | Hardy | 264—323 |
| 3,444,131 | 5/1969 | Rosenbrock et al. | 117—128.4 |
| 3,473,512 | 10/1969 | Wood | 118—405 |
| 3,502,623 | 3/1970 | Harworth et al. | 117—128.4 |

FOREIGN PATENTS

| | | | |
|---|---|---|---|
| 660,883 | 11/1951 | Great Britain | 260—47 C |

WILLIAM D. MARTIN, Primary Examiner

R. M. SPEER, Assistant Examiner

U.S. Cl. X.R.

117—21, 65.2, 105.2, 128.4, 161 K